US008649634B2

(12) United States Patent
Zhang et al.

(10) Patent No.: US 8,649,634 B2
(45) Date of Patent: Feb. 11, 2014

(54) METHOD AND DEVICE FOR IMAGE ZOOMING

(75) Inventors: Wei Zhang, Kunshan (CN); Bingyu Si, Kunshan (CN); Chi-Tien Lee, Kunshan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 750 days.

(21) Appl. No.: 12/886,175

(22) Filed: Sep. 20, 2010

(65) Prior Publication Data

US 2012/0002901 A1 Jan. 5, 2012

(30) Foreign Application Priority Data

Jul. 5, 2010 (CN) .......................... 2010 1 0218693

(51) Int. Cl.
*G06K 9/32* (2006.01)
(52) U.S. Cl.
USPC ........... 382/298; 382/276; 382/277; 382/293; 382/299; 382/300; 348/240.99; 348/240.2; 348/333.12; 348/581
(58) Field of Classification Search
None
See application file for complete search history.

(56) References Cited

U.S. PATENT DOCUMENTS 4,472,732 A * 9/1984 Bennett et al. ................. 348/452
4,484,192 A * 11/1984 Seitz et al. ................. 340/995.18
7,630,584 B2 * 12/2009 Nose et al. .................... 382/300
2009/0003730 A1 * 1/2009 Pande et al. .................. 382/298
2009/0103834 A1 * 4/2009 Jeffrey .......................... 382/298

FOREIGN PATENT DOCUMENTS

JP 3392624 B2 * 3/2003

OTHER PUBLICATIONS

Machine language translation of Japanese Publication No. 3392624B2—translated on May 23, 2013.*
Thomson Reuters' abstract of Japanese Publication No. 3392624B2, 2013.*

* cited by examiner

*Primary Examiner* — Matthew Bella
*Assistant Examiner* — Jason Heidemann
(74) *Attorney, Agent, or Firm* — Marshall, Gerstein & Borun LLP

(57) ABSTRACT

A device and a method for image zooming are provided, in which two FIFO buffer units and a read/write control unit are added between a data storage unit and an image zooming unit. The read/write control unit respectively controls two FIFO buffer units to obtain and output the gray values of the pixels on the two adjacent channels to the image zooming unit in parallel. Then, the image zooming unit calculates gray values of pixels to be inserted between the two adjacent channels to finish interpolation. The image zooming unit need not read the gray values of the pixels on the two adjacent channels in the zooming direction from the data storage unit in series and in turn, but instead, may simultaneously read the gray values of the pixels on the two adjacent channels to pixels to be inserted from the two FIFO buffer units in parallel.

16 Claims, 3 Drawing Sheets

METHOD AND DEVICE FOR IMAGE ZOOMING

CROSS REFERENCE TO RELATED APPLICATION

This application claims the benefit of priority from Chinese Patent Application No. 201010218693.3 filed on Jul. 5, 2010, the entire content of which is hereby incorporated by reference.

FIELD OF THE INVENTION

The present invention relates to image processing technologies, and more particularly, to a device and method for image zooming.

BACKGROUND OF THE INVENTION

For conventional image processing technology, some effective methods are usually required to change the size of an original image, and further to ensure that a target image obtained has a better quality, without obvious image distortion.

Generally, conventional image zooming is implemented by a bilinear interpolation method that can eliminate obvious image quality problems such as sawtooth and/or mosaic, and can keep pixel information of the original image so that the zoomed target image is smoother and better for vision.

FIG. 3 is a schematic diagram illustrating a conventional device 100 for image zooming. The device 100 includes a data input unit 102, a first data storage unit 104, a first directional image zooming unit 106, a second data storage unit 108, a second directional image zooming unit 110 and an image output unit 112. A first direction and a second direction are vertical to each other.

The data input unit is adapted to input positions and gray values of individual pixels in the original image to the first data storage unit 104.

The first data storage unit 104 is adapted to store the positions and the gray values of the individual pixels in the original image temporarily, and input the gray values of the individual pixels in the original image to the first directional image zooming unit 106 in turn.

The first directional image zooming unit 106 is adapted to read the gray value of the pixel on a former channel of two adjacent channels in the first direction from the first data storage unit 104, and then read that on a latter one. The first directional image zooming unit 106 further calculates gray values of pixels to be inserted according to the gray values of the pixels on the two adjacent channels, inserts new pixels to finish the first directional zooming of the image, and then sends the image zoomed in the first direction to the second data storage unit 100.

The second data storage unit 108 is adapted to store positions and gray values of the individual pixels in the image zoomed in the first direction, and input the gray values of the pixels in the image zoomed in the first direction to the second directional image zooming unit 110 in turn.

The second directional image zooming unit 110 is adapted to receive gray values of pixels on two adjacent channels in the second direction from the second data storage unit 108, calculate gray values of pixels to be inserted, insert new pixels to finish the second directional zooming of the image, and input a target image obtained and zoomed finally to the image output unit 112.

The image output unit 112 is adapted to output the target image received from the second directional image zooming unit 110.

According to the principle of the bilinear interpolation performed for image zooming, the first data storage unit 104 generally writes the gray value of the pixel on the former channel of two adjacent channels in the first direction into the first directional image zooming unit 106, and afterwards writes that gray value from the latter channel into the first directional image zooming unit 106, after which the gray values of the pixels on the two adjacent channels are written, and then the interpolation zooming is performed to obtain the gray values of pixels to be inserted between the two adjacent channels, and thereby the final target image is obtained. As shown in FIG. 3, after reading the gray value of the pixel in the original image on the former channel of the two adjacent channels, the first directional image zooming unit 106 needs to wait for one clock period to continue to read the gray value of the pixel in the original image on the latter channel, and then inserts new pixels into gaps generated in the target image to finish the interpolation zooming of the image. The image zooming in the second direction is basically the same as that in the first direction. In the conventional device for image zooming, the speed and efficiency of data reading are relatively slow, and thus the speed of image zooming by the linear interpolation is relatively slow.

SUMMARY OF THE INVENTION

In view of the above, the present invention provides a device for image zooming, which can increase the speed of image zooming and thereby increase the efficiency of image zooming.

The present invention provides a method for image zooming, which can increase the speed of image zooming and thereby increase the efficiency of image zooming.

According to one aspect of the present invention, a device for image zooming includes: an image input unit, a data storage unit, a read/write control unit, a first First-In First-Out (FIFO) buffer unit, a second FIFO buffer unit, an image zooming unit and an image output unit; wherein the image input unit is adapted to input positions and gray values of individual pixels in an original image to the data storage unit;

the data storage unit is adapted to store the positions and gray values of the individual pixels in the original image temporarily;

the read/write control unit controls data reading operations of the first FIFO buffer unit, the second FIFO buffer unit and the image zooming unit;

the first FIFO buffer unit is to read a gray value of a pixel on a former channel of two adjacent channels in a zooming direction from the data storage unit or the second FIFO buffer unit, and is to store the read gray value on the former channel temporarily under control of the read/write control unit;

the second FIFO buffer unit is to read a gray value of a pixel on a latter channel of the two adjacent channels in the zooming direction from the data storage unit or the first FIFO buffer unit, and is to store the gray value on the latter channel temporarily under control of the read/write control unit;

the image zooming unit is adapted to read the gray values of the pixels on the two adjacent channels in the zooming direction from the first FIFO buffer unit and the second FIFO buffer unit in parallel, calculate gray values of pixels to be inserted between the two adjacent channels, perform interpolation zooming to obtain a target image zoomed; and send the target image to the image output unit under control of the read/write control unit; and the image output unit is adapted to output the target image.

According to another aspect of the present invention, a method for image zooming includes:

storing positions and gray values of individual pixels in an original image in a data storage unit temporarily;

a FIFO buffer unit and a second FIFO buffer unit obtaining gray values of the pixels on a former channel and a latter channel of two adjacent channels in a zooming direction directly or indirectly from the data storage unit;

the first FIFO buffer unit and the second FIFO buffer unit inputting the gray values of the pixels on the former channel and the latter channel of the two adjacent channels to an image zooming unit in parallel; and the image zooming unit calculating gray values of pixels to be inserted between the two adjacent channels, and performing interpolation zooming to obtain a target image zoomed.

As can be seen from the above technical scheme, two FIFO buffer units and the read/write control unit are added between the data storage unit and the image zooming unit of the present invention. The read/write control unit is adapted to respectively control the two FIFO buffer units to directly or indirectly obtain the gray values of the pixels on two adjacent channels in a zooming direction from the data storage unit, as well as to control the two FIFO buffer units to output the gray values of the pixels on the two adjacent channels to the image zooming unit in parallel. Then, the image zooming unit calculates gray values of pixels to be inserted between the two adjacent channels to finish interpolation. The image zooming unit in the present invention does not need to read the gray values of the pixels on the two adjacent channels in the zooming direction from the data storage unit in series and in turn. But instead, the image zooming unit simultaneously reads the gray values of the pixels on the two channels adjacent to pixels to be inserted from the two FIFO buffer units in parallel; and thereby the speed and efficiency of image zooming are increased.

DETAILED DESCRIPTION

To make the objective, technical scheme and merits of the present invention clearer, the present invention will be described hereinafter in detail with reference to accompanying drawings and example.

To solve the problem in the convention technical scheme that it is needed required to wait for one clock period to read data of an original image during the image zooming and thus, resulting in leads to a low processing speed for the conventional image zooming device for image zooming, the present invention provides an image zooming device for image zooming which can simultaneously read the gray values of each of the pixels on two adjacent channels (i.e. two adjacent rows or two adjacent columns) in the original image within only one clock period. In addition, while performing interpolation zooming for the original image, the image zooming device for image zooming can continuously obtain the gray values of each of the pixels on two adjacent channels in the original image. Therefore, compared with the convention image zooming device for image zooming, the processing speed of image zooming in the image zooming device for image zooming of the present invention is doubled.

Specifically, two First In First Out (referred to as FIFO for short) buffer units and a read/write control unit are added between a data storage unit and an image zooming unit. The read/write control unit is adapted to respectively control the two FIFO buffer units to directly or indirectly obtain gray values of pixels on two adjacent channels in a zooming direction from the data storage unit, as well as to control the two FIFO buffer units to output the gray values of the pixels on the two adjacent channels to the image zooming unit in parallel, so that the image zooming unit calculates gray values of pixels to be inserted between the two adjacent channels to finish the interpolation.

Figure 1:
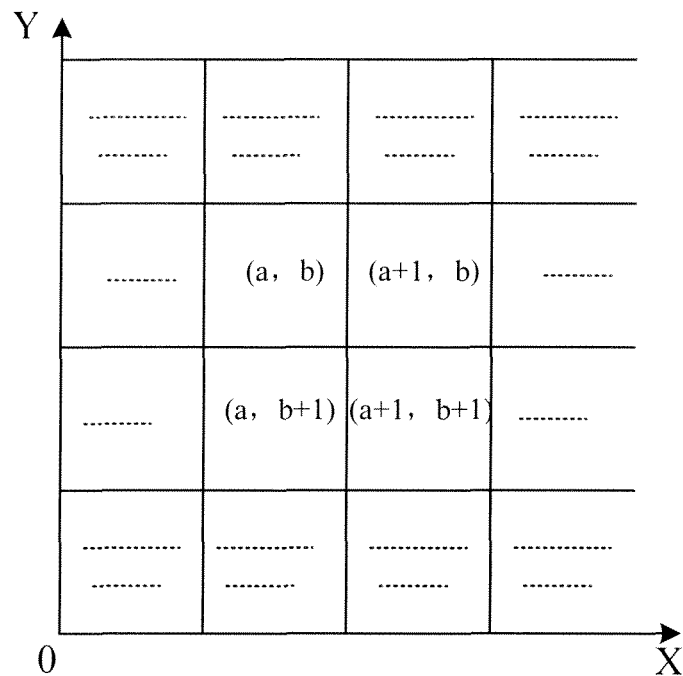
FIG. 1 is a schematic diagram illustrating an original image in a bilinear interpolation method.

A principle of performing image zooming from the original image to the target image by using the bilinear interpolation method is described hereinafter in detail with reference to FIGS. 1 and 2. FIG. 1 is a schematic diagram illustrating the original image in the bilinear interpolation method and FIG. 2 is a schematic diagram illustrating the target image obtained by performing the bilinear interpolation in the bilinear interpolation method, in which it is supposed that an image is zoomed by m times in a horizontal direction and n times in a vertical direction.

Figure 2:
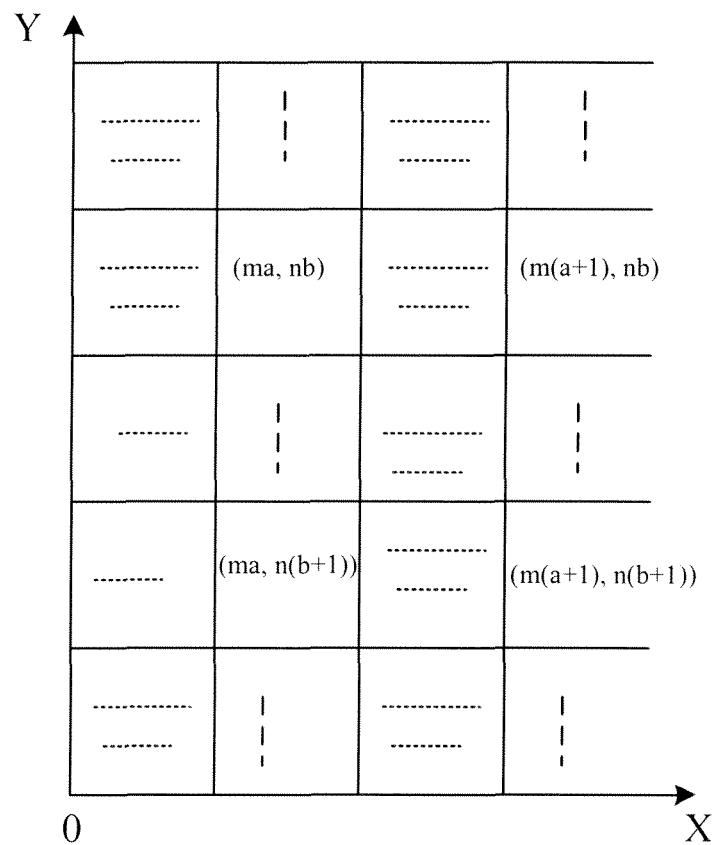
FIG. 2 is a schematic diagram illustrating a target image obtained by performing the bilinear interpolation method.
Figure 3:
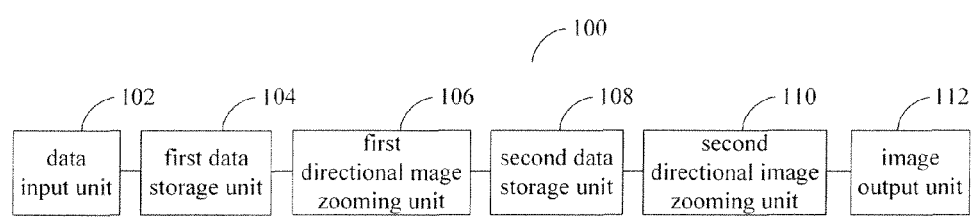
FIG. 3 is a schematic diagram illustrating a conventional device for image zooming.

First, according to corresponding relations between geometrical positions, gray values of new pixels in the target image in FIG. 2 are kept the same as gray values of pixels in corresponding positions in the original image in FIG. 1. For example, in the target image shown in FIG. 2, new pixels (ma, nb), (m(a+1), nb), (ma, n(b+1)) and (m(a+1), n(b+1)) are obtained after zoomed by m times in the horizontal direction and n times in the vertical direction, of which the gray values G(ma, nb), G(m(a+1), nb), G(ma, n(b+1)) and G(m(a+1), n(b+1)) are kept the same as those G'(a,b), G'(a+1,b), G'(a,b+1) and G'(a+1,b+1) of the four corresponding adjacent pixels (a, b), (a+1, b), (a, b+1) and (a+1, b+1) of the original image in FIG. 1.

Then, gaps are generated between the new pixels (ma, nb), (m(a+1), nb), (ma, n(b+1)) and (m(a+1), n(b+1)) in the target image in FIG. 2, and thus it is required to insert new pixels to ensure that the target image has no obvious image distortion.

In this step, new pixels are inserted into the gaps generated between the four new pixels (ma, nb), (m(a+1), nb), (ma, n(b+1)) and (m(a+1), n(b+1)) of the target image in FIG. 2. The image is zoomed by m times in the horizontal direction and n times in the vertical direction, and thus, in the target image, (n−1) rows of new pixels are required to be inserted between rows where the new pixel (ma, nb) is located and where the new pixel (ma, n(b+1)) is located, as well as (m−1) columns of new pixels are required to be inserted between columns where the new pixel (ma, nb) is located and where the new pixel (m(a+1), nb) is located.

During the bilinear interpolation process, according to the gray values of the four pixels (ma, nb), (m(a+1), nb), (ma, n(b+1)) and (m(a+1), n(b+1)) in the target image, gray values of new pixels to be inserted in an area demarcated by the four pixels are calculated, then the new pixels are inserted, and the image zooming is thus finished.

Linear interpolation zooming in the vertical direction is first performed. That is, (n−1) new pixels (ma, nb+1), (ma, nb+2), . . . , (ma, nb+n−1) and (ma, n(b+1)) are inserted between the new pixels (ma, nb) and (ma, n(b+1)); and (n−1) new pixels (m(a+1), nb+1), (m(a+1), nb+2), (m(a+1), nb+n−1) and (m(a+1), n(b+1)) are inserted between the new pixels (m(a+1), nb) and (m(a+1), n(b+1)). Gray values of the pixels to be inserted are calculated according to formulas (1) and (2):

$$G(ma, nb+i) = G(ma, nb) + \frac{i}{n}[G(ma, n(b+1)) - G(ma, nb)] \quad (1)$$
$$= \frac{n-i}{n}G(ma, nb) + \frac{i}{n}G(ma, n(b+1))$$

$$G(m(a+1), nb+i) = G(m(a+1), nb) + \quad (2)$$
$$\frac{i}{n}[G(m(a+1), n(b+1)) - G(m(a+1), nb)]$$
$$= \frac{n-i}{n}G(m(a+1), nb) + \frac{i}{n}G(m(a+1), n(b+1))$$

wherein, i=1~(n−1), both i and n are integers, and $$\frac{n-i}{n} \text{ and } \frac{i}{n}$$

are interpolation coefficients.

Linear interpolation zooming in the horizontal direction is performed after that in the vertical direction. That is, (m−1) new pixels (ma+1, nb), (ma+2, nb), (ma+m−1, nb) and (m(a+1), nb) are inserted between the new pixels (ma, nb) and (m(a+1), nb); and (m−1) new pixels (ma+1, n(b+1)), (ma+2, n(b+1)), (ma+m−1, n(b+1)) and (m(a+1), n(b+1)) are inserted between the new pixels (ma, n(b+1)) and (m(a+1), n(b+1)). Gray values of the pixels to be inserted are calculated according to formulas (3) and (4):

$$G(ma+j, nb) = G(ma, nb) + \frac{j}{m}[G(m(a+1), nb) - G(ma, nb)] \quad (3)$$
$$= \frac{m-j}{m}G(ma, nb) + \frac{j}{m}G(m(a+1), nb)$$

$$G(ma+j, n(b+1)) = G(ma, n(b+1)) + \quad (4)$$
$$\frac{j}{m}[G(m(a+1), n(b+1)) - G(ma, n(b+1))]$$
$$= \frac{m-j}{m}G(ma, n(b+1)) + \frac{j}{m}G(m(a+1), n(b+1))$$

wherein, j=1~(m−1), both j and m are integers, and $$\frac{m-j}{m} \text{ and } \frac{j}{m}$$

are interpolation coefficients.

After the linear interpolation zooming in the vertical direction, gray values of new pixels (ma+j, nb+i) which are required to be inserted when the newly-inserted pixels (ma, nb+i) and (m(a+1), nb+i) are zoomed in the horizontal direction are calculated according to formula (5):

$$G(ma+j, nb+i) = \quad (5)$$
$$G(ma, nb+i) + \frac{j}{m}[G(m(a+1), nb+i) - G(ma, nb+i)]$$

Wherein, i=1~(n−1), j=1~(m−1), and i, j, m and n are integers.

In the above, the process of zooming the original image is described by taking an example of zooming the original image in the vertical direction first and then in the horizontal direction to obtain the target image. As zooming the original image in the horizontal direction first and then in the vertical direction is similar to the above description, that alternative will not be described in detail.

Whether the original image in FIG. 1 is zoomed firstly in the horizontal direction and then in the vertical direction or vice versa, it can be seen from the formulas (1), (2), (3) and (4) that the gray values of new pixels to be inserted into the target image in FIG. 2 are all calculated according to gray values of pixels on two adjacent channels (i.e., two adjacent rows or two adjacent columns) in the original image in FIG. 1.

The image and method for zooming device will be described hereinafter in detail with reference to two specific examples.

First Example

Figure 4:
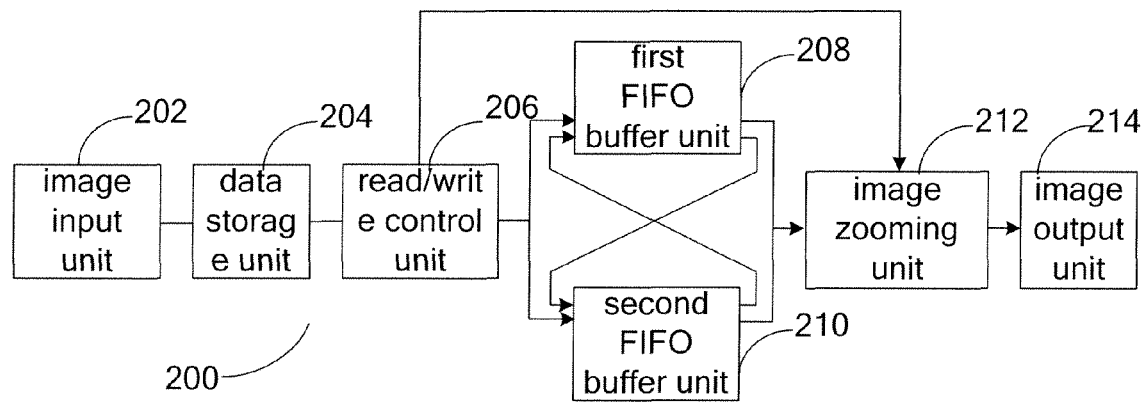
FIG. 4 is a schematic diagram illustrating a device for image zooming according to a first example of the present invention.

FIG. 4 is a schematic diagram illustrating a device for image zooming according to a first example of the present invention. As shown in FIG. 4, the device 200 for image zooming includes: an image input unit 202, a data storage unit 204, a read/write control unit 206, a first FIFO buffer unit 208, a second FIFO buffer unit 210, an image zooming unit 212 and an image output unit 214.

The image input unit 202 is adapted to input positions and gray values of individual pixels in an original image to the data storage unit 204.

The data storage unit 204 is adapted to store the positions and the gray values of the individual pixels in the original image temporarily, and output the gray value of the pixels on a first or second channel according to a data jumping instruction of the system.

The read/write control unit 206 is adapted to control data reading operations of the first FIFO buffer unit 208, the second FIFO buffer unit 210 and the image zooming unit 212.

The first FIFO buffer unit 208 is adapted to read a gray value of pixel on a former channel of two adjacent channels in the zooming direction from the data storage unit or from the second FIFO buffer unit 210, and store the gray value temporarily, under the control of the read/write control unit 206.

The second FIFO buffer unit 210 is adapted to read a gray value of pixel on a latter channel of the two adjacent channels in the zooming direction from the data storage unit or from the first FIFO buffer unit 208, and store the gray value temporarily, under the control of the read/write control unit 206.

The image zooming unit 212 is adapted to read the gray values of the pixels on two adjacent channels in the zooming direction from the first and the second FIFO buffer units (208 and 211) in parallel under the control of the read/write control unit 206, and calculate gray values of pixels to be inserted between the two adjacent channels, then perform interpolation zooming to obtain an target image and send the target image to the image output unit 214.

The image output unit is adapted to output the target image.

In this example, one channel of pixels refers to those in one row or one column, and the image zooming unit 212 is a zooming unit in a vertical direction or a horizontal direction, while the image in the bilinear interpolation method is an interpolation zooming performed both in the vertical direction and in the horizontal direction, and thereby zooming principles and steps in the vertical direction and in the horizontal direction are completely the same. Therefore, in this example, image zooming in the vertical direction is only described as an example, and the image zooming in the horizontal direction will not be described in detail again.

In this example, the above-mentioned former and latter channels which are adjacent in the zooming direction are the two adjacent rows in the vertical direction when the image zooming is performed in the vertical direction, as well as the two adjacent columns in the horizontal direction when the image zooming is performed in the horizontal direction.

In this example, the read/write control unit controls the first FIFO buffer unit 208, the second FIFO buffer unit 210 and the image zooming unit 212 by reading control instructions. The reading control instructions provided by the read/write control unit 206 include three types, that is a first reading control instruction, a second reading control instruction and a third reading control instruction. When the read/write control unit 206 provides the first reading control instruction, the first FIFO buffer unit 208 and the second FIFO buffer unit 210 perform a data clearing operation. When the read/write control unit 206 provides the second reading control instruction, the first FIFO buffer unit 208 reads data from the data storage unit 204, and the second FIFO buffer unit 210 reads data from the first FIFO buffer unit 208. When the read/write control unit 206 provides the third reading control instruction, the second FIFO buffer unit 210 reads data from the data storage unit 204, and the first FIFO buffer unit 208 reads data from the second FIFO buffer unit 210.

of the pixels in the original image, as well as two columns of pixels are inserted between every two adjacent columns of the pixels. Only an example that an image is zoomed by 3 times in the vertical direction instead in the horizontal direction will be described in this context.

In this example, the image input unit is adapted to input position coordinates and gray values of the 5×5 pixels in the original image to the data storage unit for temporarily storing. Then, according to a reading control instruction of the read/write control unit 206, the first FIFO buffer unit 208, the second FIFO buffer unit 210 and the image zooming unit 212 perform corresponding data reading operations from the data storage unit respectively.

In the given example that n=m=3, the three types of reading control instructions provided by the read/write control unit are indicated by 00, 01 and 10 respectively, wherein 00 is the first reading control instruction indicating that the first FIFO buffer unit 208 and the second FIFO buffer unit 210 perform the data clearing operations, 01 is the second reading control instruction indicating that the first FIFO buffer unit 208 actively performs the data reading operation from the data storage unit 204 and the second FIFO buffer unit 200 performs the data reading operation from the first FIFO buffer unit 208, and 10 is the third reading control instruction indicating that the second FIFO buffer unit 210 actively performs the data reading operation from the data storage unit 204 and the first FIFO buffer unit 208 performs the data reading operation from the second FIFO buffer unit 210.

When the read/write control unit 206 provides the first reading control instruction 00, clearing index bits of both the first FIFO buffer unit 205 and the second FIFO buffer unit 210 are valid and data thereof are cleared.

TABLE 1

| | | | | | | | | | | | | | | |
|---|---|---|---|---|---|---|---|---|---|---|---|---|---|---|
| Data (rows) output by the data storage unit | S1 | S2 | S1 | S1 | S3 | S2 | S2 | S4 | S3 | S3 | S5 | S4 | S4 | S4 |
| Reading control instructions of the read/write control unit | 01 | 01 | 01 | 10 | 01 | 01 | 10 | 01 | 01 | 10 | 01 | 01 | 10 | 01 |
| Data (rows) written by the first FIFO buffer unit | S1 | S2 | S1 | S2 | S3 | S2 | S3 | S4 | S3 | S4 | S5 | S4 | S5 | S4 |
| Data (rows) read by the first FIFO buffer unit | | S1 | S2 | S1 | S2 | S3 | S2 | S3 | S4 | S3 | S4 | S5 | S4 | S5 |
| Data (rows) written by the second FIFO buffer unit | | S1 | S2 | S1 | S2 | S3 | S2 | S3 | S4 | S3 | S4 | S5 | S4 | S5 |
| Data (rows) read by the second FIFO buffer unit | | | S1 | S2 | S1 | S2 | S3 | S2 | S3 | S4 | S3 | S4 | S5 | S4 |
| Interpolation coefficients of data rows read by the first FIFO buffer unit $\left(\frac{n-i}{n}\right)$ | | | | 1 | $2/3$ | $1/3$ | 1 | $2/3$ | $1/3$ | 1 | $2/3$ | $1/3$ | 1 | $2/3$ | $1/3$ |
| Interpolation coefficients of data rows read by the second FIFO buffer unit $\left(\frac{i}{n}\right)$ | | | | 0 | $1/3$ | $2/3$ | 0 | $1/3$ | $2/3$ | 0 | $1/3$ | $2/3$ | 0 | $1/3$ | $2/3$ |

In this example, it is supposed that there are 5×5 pixels in the original image shown in FIG. 1, i.e., 5 rows and 5 columns of pixels, of which row numbers are respectively S1, S2, S3, S4 and S5, wherein S1, S3 and S5 represent odd-numbered rows and S2 and S4 represent even-numbered rows. The target image shown in FIG. 2 is obtained after the original image is zoomed by n×m times, wherein n indicates a zooming factor in the vertical direction while m indicates a zooming factor in the horizontal direction. In this example, n=m=3, i.e., the original image is zoomed by 3 times in both the vertical direction and the horizontal direction. That is, two rows of pixels are inserted between every two adjacent rows As shown in Table 1, after the first FIFO buffer unit 208 and the second FIFO buffer unit 210 clear the data, the read/write control unit 206 provides the second reading control instruction 01 in the first clock period, and at this moment, the first FIFO buffer unit 208 actively reads gray values of pixels in the Row S1 of the original image from the data storage unit 204.

In the second clock period, the read/write control unit 206 also provides the second reading control instruction 01, and at this moment, the first FIFO buffer unit 208 reads gray values of pixels in the Row S2 of the original image from the data storage unit 204, and meanwhile writes the gray values of the pixels in the Row S1 of the original image in the first FIFO buffer unit 208 into the second FIFO buffer unit 210.

In the third clock period, the read/write control unit 206 also provides the second reading control instruction 01, the first FIFO buffer unit 208 actively reads the gray values of the pixels in the Row S1 of the original image from the data storage unit 204, and meanwhile writes into the second FIFO buffer unit 210 and the image zooming unit 212 the gray values of the pixels in the Row S2 of the original image which are stored in the first FIFO buffer unit 208 in the previous clock period. At this moment, the second FIFO buffer unit 210 also writes the gray values of the pixels in the Row S1 of the original image stored in the previous clock period into the image zooming unit 212. Therefore, within one clock period, the image zooming unit 212 may perform bilinear interpolation zooming according to the gray values of the pixels in the Rows S1 and S2 at the same time. In the interpolation zooming according to the formulas (1) and (2), respective values of interpolation coefficients $$\left(\frac{n-i}{n}\right) \text{ and } \left(\frac{i}{n}\right)$$

are shown in Table 1.

In the fourth clock period, the read/write control unit 206 provides the third reading control instruction 10, and the second FIFO buffer unit 210 actively reads the gray values of the pixels in the Row S1 of the original image from the data storage unit 204, and meanwhile writes the gray values of the pixels in the Row 32 of the original image stored in the previous clock period into the first FIFO buffer unit 208 and the image zooming unit 212. At this moment, the first FIFO buffer unit 208 also writes the gray values of the pixels in the Row S1 of the original image stored in the previous clock period into the image zooming unit 212. At this moment, the image zooming unit 212 performs the bilinear interpolation zooming within one clock period according to the gray values of the pixels in the Rows S1 and S2 of the original image. In the interpolation zooming according to the formulas (1) and (2), respective values of interpolation coefficients $$\left(\frac{n-i}{n}\right) \text{ and } \left(\frac{i}{n}\right)$$

are shown in Table 1.

As can be seen from the corresponding relation of space coordinates mapping in the image zooming, when the zooming factor of the image in the vertical direction m=3, two pixels need to be inserted between two adjacent rows in a same column in the original image to obtain the target image. In addition, further counting pixels obtained by direct mapping of the original image, 3 times of interpolation operations in total are needed to obtain the gray values of the pixels in the target image. In other words, the image zooming unit should obtain data in a same row for 3 times.

In the present invention, when the zooming factor n in the vertical direction is an odd number, a changing rule of the data rows outputted in turn by the data storage unit is S1, S2, (n−1) S1, S3, (n−1) S2, S4, (n−1) S3, S5 . . . ; and a changing rule of the reading control instructions in the read/write control unit is 01, (n−1) 10, (n−1) 01, 10 . . . . According to state signals of the read/write control unit 206, the first FIFO buffer unit 208, the second FIFO buffer unit 210 and the image zooming unit 212 perform corresponding data reading and writing operations.

In other words, when the zooming factor n in the vertical direction is an odd number, after the first FIFO buffer unit 208 and the second FIFO buffer unit 210 perform the data clearing operations according to the first reading control instruction provided by the read/write control unit 206, a changing rule of the reading control instructions provided by the read/write control unit 206 is as follows:

a1: the read/write control unit provides the second reading control instruction;

b1: the read/write control unit provides the second reading control instruction for (n−1) times;

c1: the read/write control unit provides the third reading control instruction;

d1: steps b1 and c1 in sequence are repeated until image zooming of the current frame has been finished.

Another example is when n=m=4, i.e., the original image is zoomed by 4 times in both the vertical direction and the horizontal direction. That is, three rows of pixels are inserted between every two adjacent rows in the original image, as well as three columns of pixels are inserted between every two adjacent columns. As shown in Table 2, when the read/write control unit 206 provides different reading control instructions, Table 2 indicates how the first FIFO buffer unit 208 and the second FIFO buffer unit 210 read gray values of pixels on channels from the data storage unit and input the gray values to the image zooming unit 212.

TABLE 2

| | | | | | | | | | | | | | | | | |
|---|---|---|---|---|---|---|---|---|---|---|---|---|---|---|---|---|
| Data (rows) output by the data storage unit | S1 | S2 | S1 | S1 | S1 | S3 | S2 | S2 | S2 | S4 | S3 | S3 | S3 | S5 | S4 | S4 | S4 |
| Reading control instructions of the read/write control unit | 01 | 01 | 01 | 10 | 01 | 10 | 10 | 01 | 10 | 01 | 01 | 10 | 01 | 10 | 10 | 01 | 10 |
| Data (rows) written by the first FIFO buffer unit | S1 | S2 | S1 | S2 | S1 | S2 | S3 | S2 | S2 | S4 | S3 | S4 | S3 | S4 | S5 | S4 | S5 |
| Data (rows) read by the first FIFO buffer unit | | S1 | S2 | S1 | S2 | S1 | S2 | S3 | S2 | S2 | S4 | S3 | S4 | S3 | S4 | S5 | S4 |
| Data (rows) written by the second FIFO buffer unit | | S1 | S2 | S1 | S2 | S3 | S2 | S3 | S2 | S3 | S4 | S3 | S4 | S5 | S4 | S5 | S4 |
| Data (rows) read by the second FIFO buffer unit | | | S1 | S2 | S1 | S2 | S3 | S2 | S3 | S2 | S3 | S4 | S3 | S4 | S5 | S4 | S5 |
| Interpolation coefficients of data rows read by the first FIFO buffer unit $\left(\frac{n-i}{n+1}\right)$ | | | 1 | 3/4 | 1/2 | 1/4 | 1 | 3/4 | 1/2 | 1/4 | 1 | 3/4 | 1/2 | 1/4 | 1 | 3/4 | 1/2 |

TABLE 2-continued

| Interpolation coefficients of data rows read by the second FIFO buffer unit $\left(\dfrac{i}{n+1}\right)$ | 0 | 1/4 | 1/2 | 3/4 | 0 | 1/4 | 1/2 | 3/4 | 0 | 1/4 | 1/2 | 3/4 | 0 | 1/4 | 1/2 |
|---|---|---|---|---|---|---|---|---|---|---|---|---|---|---|---|

When the zooming factor n=m=4, the first FIFO buffer unit 208, the second FIFO buffer unit 210 and the image zooming unit 212 in the device 200 for image zooming perform corresponding data reading operations according to the reading control instructions of the read/write control unit 206. In the present invention, when the zooming factor n in the vertical direction is an even number, a changing rule of data rows outputted in turn by the data storage unit is S1, S2, (n−1) S1, S3, (n−1) S2, S4, (n−1) S3, S5 . . . ; and a changing rule of the reading control instructions in the read/write control unit is 01, 01, n/2 (01, 10), n/2 (10, 01) . . . . According to the reading control instructions in the read/write control unit 206, the first FIFO buffer unit 208, the second FIFO buffer unit 210 and the image zooming unit 212 perform corresponding data reading and writing operations.

In other words, when the zooming factor n in the vertical direction is an even number, after the first FIFO buffer unit 208 and the second FIFO buffer unit 210 clear the data according to the first reading control instruction provided by the read/write control unit 206, a changing rule of the reading control instructions provided by the read/write control unit is as follows:

- a2: the read/write control unit provides the second reading control instruction for 2 times;
- b2: the read/write control unit provides the second reading control instruction and the third reading control instruction in turn, and repeats for (n/2) times;
- c2: the read/write control unit provides the third reading control instruction and the second reading control instruction in turn, and repeats for (n/2) times;
- d2: steps b2 and c2 in turn are repeated until image zooming of the current frame has been finished.

It should be explained that, in this example, whether the zooming factor n in the vertical direction is an odd number or an even number, the changing rule of the data outputted by the data storage unit 204 according to a data reading jumping instruction keeps the same, which is S1, S2, (n−1) S1, S3, (n−1) S2, S4, (n−1) S3, S5 . . . .

More specifically, the changing rule of the data outputted by the data storage unit 204 is as follows:

- s1: the data storage unit outputs a gray value of pixel on the former channel of two adjacent channels;
- s2: the data storage unit outputs a gray value of pixel on the latter channel of the two adjacent channels;
- s3: the data storage unit outputs the gray value of the pixel on the former channel of the two adjacent channels for (n−1) times;
- s4: the former channel number and the latter channel number of the two adjacent channels are respectively increased by 1 according to the channel reading address jumping instruction obtained by the data storage unit, then steps s2 and s3 are repeated in sequence until image zooming of the current frame has been finished.

In the present invention, two adjacent channels refer to two adjacent rows or two adjacent columns. For example, in the first cycle in this example, the two adjacent channels are the Row S1 and the Row S2, the former channel of the two adjacent channels is the Row S1 and the latter channel of the two adjacent channels is the Row S2. In the second cycle, the former channel number and the latter channel number of two adjacent channels are increased by 1 respectively according to the channel reading address jumping instruction obtained by the data storage unit, thus, two adjacent channels refer to the Row S2 and the Row S3 respectively, the former channel of the two adjacent channels is the Row S2 and the latter channel of the two adjacent channels is the Row S3. And by analog, processes in subsequent cycles are similar, and will not be described in detail again.

Described is an example of image zooming in the vertical direction. After the image is zoomed in the vertical direction, the principles and steps for performing the interpolation zooming of the image in the horizontal direction are the same as those in the vertical direction, which will not be described in detail again.

As can be seen from this example, within one clock period, the image zooming unit in the present invention can simultaneously obtain the gray values of the pixels on the two adjacent rows or the two adjacent columns to pixels to be inserted, and thereby the interpolation zooming can performed continuously. In contrast, the prior art needs two clock periods to insert pixels on one channel. Therefore, compared with the prior art, the device for image zooming in the present invention has a faster speed, further reduces the processing time of image zooming, and increases the efficiency of image zooming.

Figure 5:
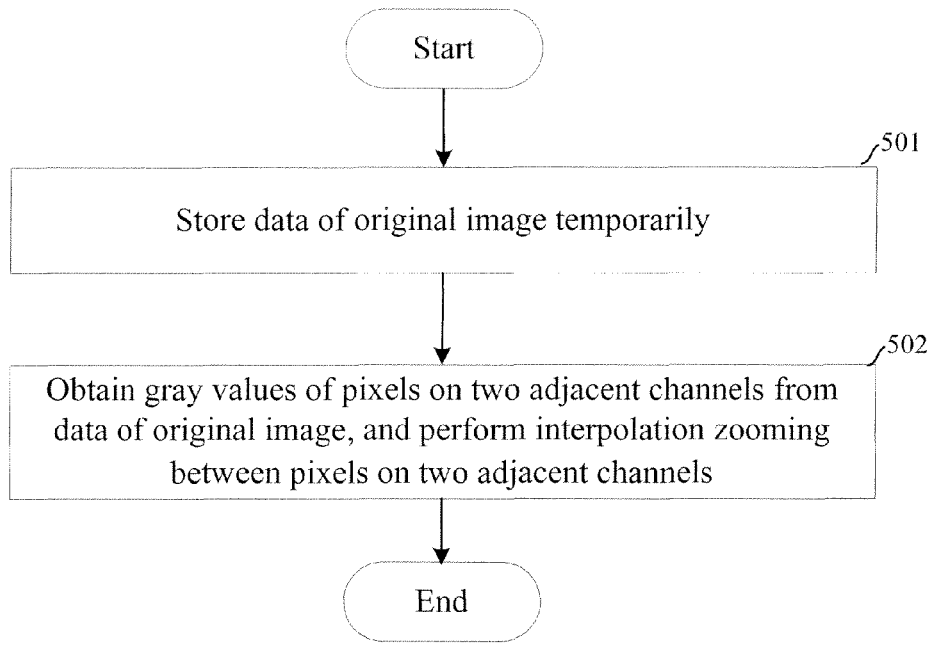
FIG. 5 is a flowchart of a method for image zooming according to an example of the present invention.

FIG. 5 is a flowchart of a method for image zooming according to an example of the present invention and as may be implemented by a device as discussed herein. The method includes the steps of:

Step 501: storing data of an original image temporarily.

Specifically, positions and gray values of individual pixels in the original image are stored in the data storage unit temporarily.

Step 502: obtaining gray values of pixels on two adjacent channels from the data of the original image, and performing interpolation zooming between the pixels on the two adjacent channels.

Specifically, a first FIFO buffer unit and a second FIFO buffer unit obtain gray values of pixels on a former channel and a latter channel of the two adjacent channels in a zooming direction from a data storage unit directly or indirectly. Then, the first FIFO buffer unit and the second FIFO buffer unit input the gray values of the pixels on the former channel and the latter channel of the two adjacent channels to an image zooming unit in parallel. The image zooming unit calculates gray values of pixels to be inserted between the pixels on the two adjacent channels, performs interpolation zooming and obtains a target image zoomed.

Second Example

Figure 6:
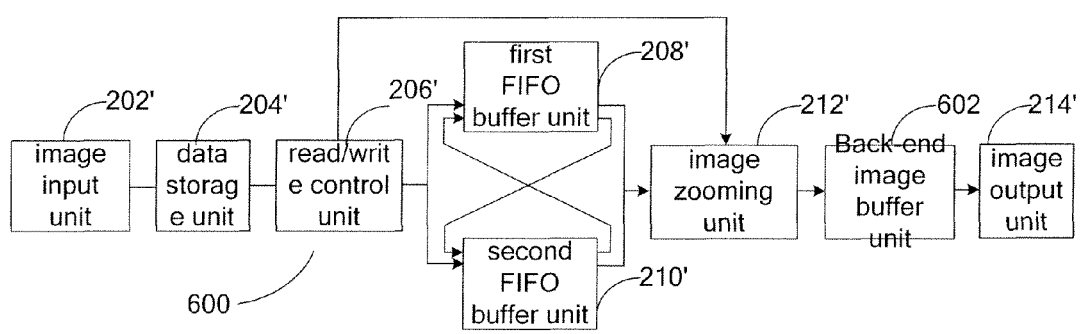
FIG. 6 is a schematic diagram illustrating a device for image zooming according to a second example of the present invention.

FIG. 6 is a schematic diagram illustrating a device 600 for image zooming according to a second example of the present invention. Different from the first example, the second example further includes a back-end image buffer unit 602. The other components of the device are similar to those of FIG. 4 and have been labeled 202'-214' for convenience purposes. The image obtained after the interpolation zooming in the image zooming unit is buffered by the back-end image buffer unit firstly and then is sent to the image output unit. The back-end image buffer unit may be a large-capacity FIFO buffer, which makes the zoomed image more stable and thereby makes the target image outputted have a better quality and effect.

The devices for image zooming in accordance with the above examples may be implemented on hardware capable of executing executable software, instructions, etc. stored on a persistent storage medium. In some examples, the devices for image zooming may be implemented by a Field Programmable Gate Array (FPGA) or a Complex Programmable Logic Device (CPLD), for example.

In the forgoing, only various embodiments are taken as examples to describe the objective, technical scheme and merits of the present invention in detail. It should be understood that, the forgoing are examples of the present invention, and should not be used to limit the present invention. For those skilled in the art, any modification, equivalent replacement and improvement made within the scope of the present invention should be covered under the protection scope of the present invention.

What is claimed is:

1. A device for image zooming comprising:
   an image input unit, a data storage unit, a read/write control unit, a first First-In First-Out (FIFO) buffer unit, a second FIFO buffer unit, an image zooming unit and an image output unit; wherein
   the image input unit is to input positions and gray values of individual pixels in an original image to the data storage unit;
   the data storage unit is to store the positions and gray values of the individual pixels in the original image temporarily;
   the read/write control unit is to control data reading operations of the first FIFO buffer unit, the second FIFO buffer unit and the image zooming unit;
   when the read/write control unit provides a second reading control instruction, the first FIFO buffer unit is to read a gray value of a pixel on a former channel of two adjacent channels in a zooming direction from the data storage unit and is to store the gray value of the pixel of the former channel temporarily, and the second FIFO buffer unit is to read a gray value of a pixel on a latter channel of two adjacent channels in a zooming direction from the first FIFO buffer unit and is to store the gray value of the pixel on the latter channel temporarily;
   when the read/write control unit provides a third reading control instruction, the second FIFO buffer unit is to read a gray value of a pixel on a former channel of two adjacent channels in a zooming direction from the data storage unit and is to store the gray value of the pixel of the former channel temporarily, and the first FIFO buffer unit is to read a gray value of a pixel on the latter channel of two adjacent channels in a zooming direction from the first FIFO buffer unit and is to store the gray value of the pixel on the latter channel temporarily;
   the image zooming unit is to read the gray values of the pixels on the two adjacent channels in the zooming direction from the first FIFO buffer unit and the second FIFO buffer unit in parallel, calculate gray values of pixels to be inserted between the two adjacent channels, perform interpolation zooming to obtain a target image zoomed, and send the target image to the image output unit under control of the read/write control unit;
   the image output unit is to output the target image; and
   wherein when a zooming factor is n, n being a natural number, the data storage unit inputs the positions and gray values of the pixels in the original image to the first FIFO buffer unit or the second FIFO buffer unit according to,
   (s1) the data storage unit outputs the gray value of the pixel on the former channel of the two adjacent channels,
   (s2) the data storage unit outputs the gray value of the pixel on the latter channel of the two adjacent channels,
   (s3) the data storage unit outputs the gray value of the pixel on the former channel of the two adjacent channels for (n−1) times, and
   (s4) the former channel number and the latter channel number of the two adjacent channels are respectively increased by 1 according to the channel reading address lumping instruction obtained by the data storage unit, then s2 and s3 are repeated in sequence until image zooming of the current frame has been finished.

2. The device for image zooming of claim 1, further comprising a back-end image buffer unit between the image zooming unit and the image output unit, which is to buffer the target image obtained after the interpolation zooming performed by the image zooming unit and send the target image to the image output unit.

3. The device for image zooming of claim 2, wherein
   when the read/write control unit provides a first reading control instruction, the first FIFO buffer unit and the second FIFO buffer unit clear data.

4. The device for image zooming of claim 3, wherein, when the zooming factor n in the zooming direction is an odd number, a changing rule of reading control instructions provided by the read/write control unit is:
   (a1) the read/write control unit provides the first reading control instruction;
   (b1) the read/write control unit provides the second reading control instruction;
   (c1) the read/write control unit provides the second reading control instruction for (n−1) times;
   (d1) the read/write control unit provides the third reading control instruction; and
   (e1) c1 and d1 are repeated in sequence until image zooming of the current frame has been finished.

5. The device for image zooming of claim 3, wherein, when the zooming factor n in the zooming direction is an even number, a changing rule of reading control instructions provided by the read/write control unit is:
   (a2) the read/write control unit provides the first reading control instruction;
   (b2) the read/write control unit provides the second reading control instruction for 2 times;
   (c2) the read/write control unit provides the second reading control instruction and the third reading control instruction in turn, and repeats for (n/2) times;
   (d2) the read/write control unit provides the third reading control instruction and the second reading control instruction in turn, and repeats for (n/2) times; and
   (e2) c2 and d2 are repeated in sequence until image zooming of the current frame has been finished.

6. The device for image zooming of claim 1, wherein
   when the read/write control unit provides a first reading control instruction, the first FIFO buffer unit and the second FIFO buffer unit clear data.

7. The device for image zooming of claim 6, wherein, when the zooming factor n in the zooming direction is an odd number, a changing rule of reading control instructions provided by the read/write control unit is:

(a1) the read/write control unit provides the first reading control instruction;
(b1) the read/write control unit provides the second reading control instruction;
(c1) the read/write control unit provides the second reading control instruction for (n−1) times;
(d1) the read/write control unit provides the third reading control instruction; and
(e1) c1 and d1 are repeated in sequence until image zooming of the current frame has been finished.

8. The device for image zooming of claim 6, wherein, when the zooming factor n in the zooming direction is an even number, a changing rule of reading control instructions provided by the read/write control unit is:
(a2) the read/write control unit provides the first reading control instruction;
(b2) the read/write control unit provides the second reading control instruction for 2 times;
(c2) the read/write control unit provides the second reading control instruction and the third reading control instruction in turn, and repeats for (n/2) times;
(d2) the read/write control unit provides the third reading control instruction and the second reading control instruction in turn, and repeats for (n/2) times; and
(e2) c2 and d2 are repeated in sequence until image zooming of the current frame has been finished.

9. The device for image zooming of claim 1, wherein the device for image zooming is implemented by a Field Programmable Gate Array or a Complex Programmable Logic Device.

10. A method for image zooming comprising:
storing positions and gray values of individual pixels in an original image in a data storage unit temporarily;
according to a second reading control instruction which provided by a read/write control unit, obtaining gray values of pixels on a former channel of two adjacent channels in a zooming direction from a data storage unit and storing the gray values of pixels on the former channel of two adjacent channels in a first FIFO buffer unit temporarily; and obtaining gray values of pixels on a latter channel of two adjacent channels in a zooming direction from the first FIFO buffer unit and storing the gray values of pixels on the latter channel of two adjacent channels in a second FIFO buffer unit temporarily;
according to a third reading control instruction which provided by a read/write control unit, obtaining gray values of pixels on a former channel of two adjacent channels in a zooming direction from a data storage unit and storing the gray values of pixels on the former channel of two adjacent channels in a second FIFO buffer unit temporarily; and obtaining gray values of pixels on a latter channel of two adjacent channels in a zooming direction from the second FIFO buffer unit and storing the gray values of pixels on the latter channel in a first FIFO buffer unit temporarily; and
calculating gray values of pixels to be inserted between the two adjacent channels, and performing interpolation zooming to obtain a target image zoomed by using an image zooming unit; and
when a zooming factor is n, n being a natural number, the data storage unit inputs the positions and the gray values of the pixels in the original image to the first FIFO buffer unit or the second FIFO buffer unit according to,
(s1) the data storage unit outputs the gray value of the pixel on the former channel of the two adjacent channels,
(s2) the data storage unit outputs the gray value of the pixel on the latter channel of the two adjacent channels,
(s3) the data storage unit outputs the gray value of the pixel on the former channel of the two adjacent channels for (n−1) times, and
(s4) the former channel number and the latter channel number of the two adjacent channels are increased respectively by 1 according to a channel reading address lumping instruction obtained by the data storage unit, and s2 and s3 are repeated in sequence until image zooming of the current frame has been finished.

11. The method for image zooming of claim 10, wherein the first FIFO buffer unit and the second FIFO buffer unit perform data reading operations from the data storage unit according to a reading control instruction in a read/write control unit.

12. The method for image zooming of claim 11, further comprising:
providing a first reading control instruction by the read/write control unit, and performing data clearing operations by the first FIFO buffer unit and the second FIFO buffer unit before performing the data reading operations by the first FIFO buffer unit and the second FIFO buffer unit.

13. The method for image zooming of claim 12, wherein when the zooming factor n is an odd number, a changing rule of the reading control instruction provided by the read/write control unit is:
(a1) the read/write control unit provides the second reading control instruction;
(b1) the read/write control unit provides the second reading control instruction for (n−1) times;
(c1) the read/write control unit provides the third reading control instruction; and
(d1) b1 and c1 are repeated in sequence until image zooming of the current frame has been finished.

14. The method for image zooming of claim 12, wherein, when the zooming factor n is an even number, a changing rule of the reading control instruction provided by the read/write control unit is:
(a2) the read/write control unit provides the second reading control instruction for 2 times;
(b2) the read/write control unit provides the second reading control instruction and the third reading control instruction in turn, and repeats for n/2 times;
(c20 the read/write control unit provides the third reading control instruction and the second reading control instruction in turn, and repeats for n/2 times; and
(d2) b2 and c2 are repeated in sequence until image zooming of the current frame has been finished.

15. The method for image zooming of claim 11, wherein when the zooming factor n is an odd number, a changing rule of the reading control instruction provided by the read/write control unit is:
(a1) the read/write control unit provides the second reading control instruction;
(b1) the read/write control unit provides the second reading control instruction for (n−1) times;
(c1) the read/write control unit provides the third reading control instruction; and
(d1) b1 and c1 are repeated in sequence until image zooming of the current frame has been finished.

16. The method for image zooming of claim 11, wherein when the zooming factor n is an even number, a changing rule of the reading control instruction provided by the read/write control unit is:
(a2) the read/write control unit provides the second reading control instruction for 2 times;

(b2) the read/write control unit provides the second reading control instruction and the third reading control instruction in turn, and repeats for n/2 times;
(c2) the read/write control unit provides the third reading control instruction and the second reading control instruction in turn, and repeats for n/2 times; and
(d2) b2 and c2 are repeated in sequence until image zooming of the current frame has been finished.

* * * * *